Patented Aug. 9, 1949

2,478,520

UNITED STATES PATENT OFFICE 2,478,520

BACON SUBSTITUTES

Michael Baur, Vancouver, British Columbia, Canada

No Drawing. Application January 13, 1948, Serial No. 2,140. In Canada, October 20, 1947

7 Claims. (Cl. 99—107)

My invention relates to improvements in bacon substitutes.

The object of the invention is to provide a substitute for bacon which when sliced, has the appearance of side bacon and has substantially the same flavour. Further objects are to provide a bacon substitute which is relatively cheap, and one, which while made of a plurality of meat products, will hold together during cooking and subsequent serving. A still further object is to provide a bacon substitute which is edible in its marketable form, or without being subsequently cooked in the home or restaurant, and one which has greater keeping qualities than similarly salted bacon and has less shrinkage in frying than bacon.

The invention contemplates a food product made from pork, steer beef and pork belly skin, smoked and cured and suitably compressed to form a compact product.

The preferred proportion by weight of the various ingredients is 80 percent of pork, 10 percent of pork rind, and 10 percent of beef. The ingredients may vary quantitatively by increasing the weight of the beef and pork rind or both of them up to 15 percent each and accordingly reducing the weight of the pork.

The pork content is preferably made up from the belly and from loin trimmings and is chopped into one inch cubes. The pork skin and the beef are chopped fine and are boiled with a quantity of hot milk, say one quart to each 100 pounds of bacon substitute for two and a half hours until the skin is reduced to a jelly. After boiling, the skin and beef are beaten into an emulsion and subsequently cooled. The paste or emulsion is then mixed with the chopped pork meat and dry bacon curing ingredients, such as nitrate, salt, sugar, etc., are added in appropriate quantities and the whole is intimately mixed to disseminate the paste throughout the cubed pork meat. After thorough mixing, the product is forced through a suitable die to deliver it in slab form onto wire racks. The slabs so formed are desirably 1½ inches deep, 8 inches wide and up to 32 inches long, or approximately that of a normal side of bacon.

The slabs are put in a cooler and are held down to around 37 degrees Fahrenheit for a period of 70 hours to consolidate and dry out, when they are placed in a smoke house and maintained at a temperature of around 150 degrees Fahrenheit for about 4 hours, after which the temperature is reduced to around 100 degrees Fahrenheit for a further period of around 8 hours. When the smoking is completed, the bacon can, without other treatment, be eaten if desired.

When the slabs are fully smoked, they are chilled to around zero temperature, which with slabs of the dimensions described, should be for about 4 hours. When in a frozen condition, the product is cut into slices as thin as $\frac{1}{32}$ of an inch without disintegration, and wrapped in half pound packages, or packages of other desired size.

What I claim as my invention is:

1. The method of making bacon substitute which consists of making an emulsion of comminuted pork skin and milk, adding thereto finely chopped meat, beating them into a paste, adding pieces of fresh pork meat thereto, adding curing ingredients, compressing the mass and subsequently smoking the compressed product.

2. The method of making bacon substitute which consists of reducing pork skin to a gelatinous state by boiling, mixing finely chopped beef thereto to form a paste, mixing the paste with cubed pork meat, adding curing ingredients, mixing and compressing said mass and curing the product by a smoking process.

3. The method of making bacon substitute which consists of reducing pork skin to a gelatinous state by boiling with some milk, adding thereto chopped beef and pork cuttings chopped into cubes of substantial size, and curing ingredients, subsequently curing said composition by smoking.

4. The method of making bacon substitute which consists of reducing work skin to a gelatinous state by boiling with some milk, adding thereto chopped beef and pork cuttings chopped into cubes of substantial size, and curing ingredients, subsequently curing said composition by smoking at around 150 degrees Fahrenheit for around four hours and subsequently at around 100 degrees Fahrenheit.

5. The method of making bacon substitute which consists of reducing pork skin to a gelatinous form by boiling with milk, adding thereto a quantity of bull meat and beating same to a paste, adding curing ingredients and chopped pork meat to the paste, compressing the mass in slab form to a predetermined size, maintaining said slab at a temperature of around 37 degrees Fahrenheit for about 70 hours, subsequently treating the slabs in a smoke house at around 100 degrees Fahrenheit for a period of around 8 hours.

6. A bacon substitute in the form of a smoked paste comprising beef and pork trimmings, pork skin and bacon curing ingredients.

7. A bacon substitute in the form of a smoked paste comprising beef and pork trimmings, bacon skin and bacon curing ingredients.

MICHAEL BAUR.

REFERENCES CITED

The following references are of record in the file of this patent:

UNITED STATES PATENTS

| Number | Name | Date |
|---|---|---|
| 97,268 | Bell | Nov. 30, 1869 |
| 1,063,358 | Lamb | June 3, 1913 |
| 2,388,823 | Britt | Nov. 13, 1945 |